Patented Sept. 23, 1924.

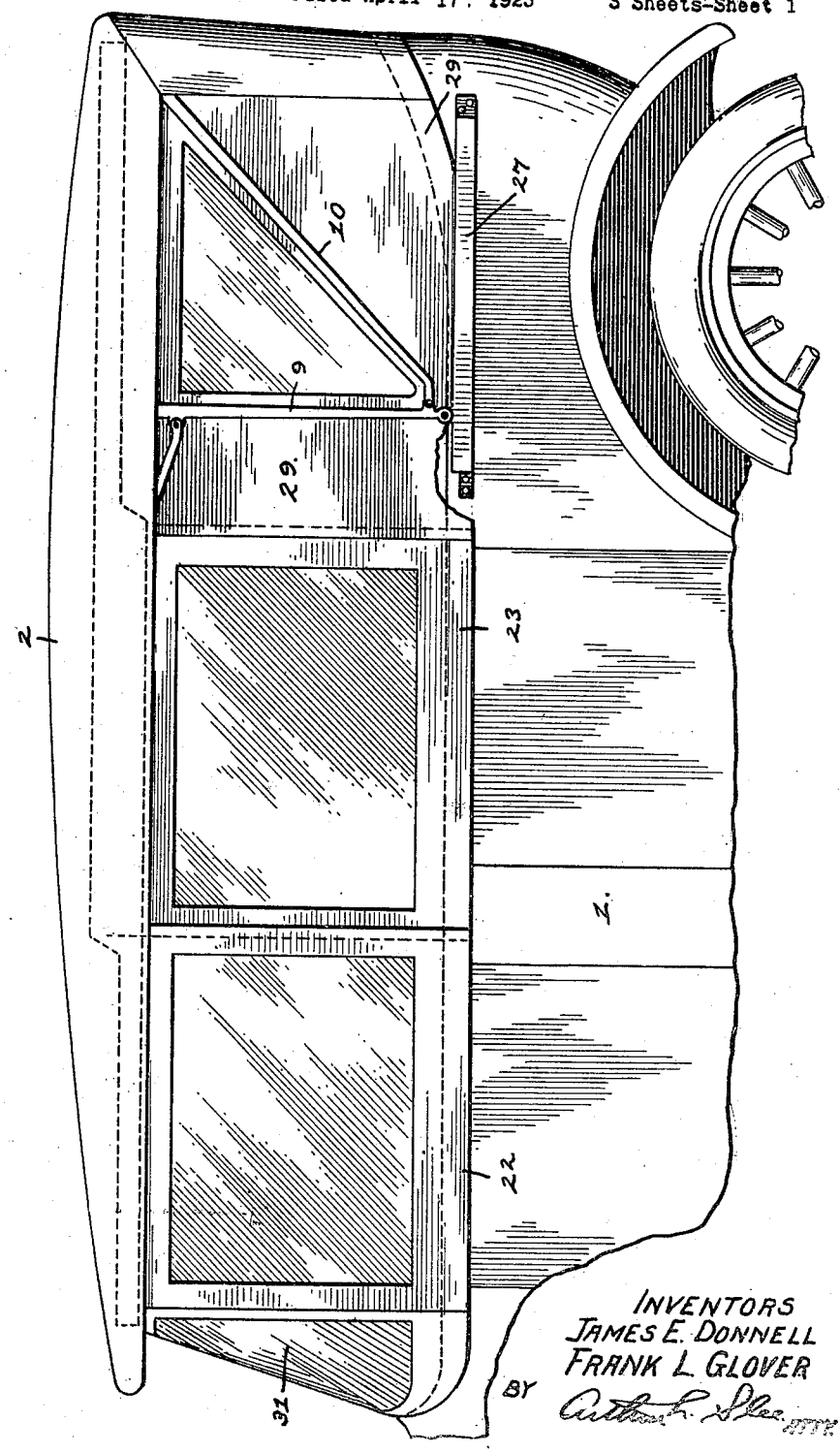

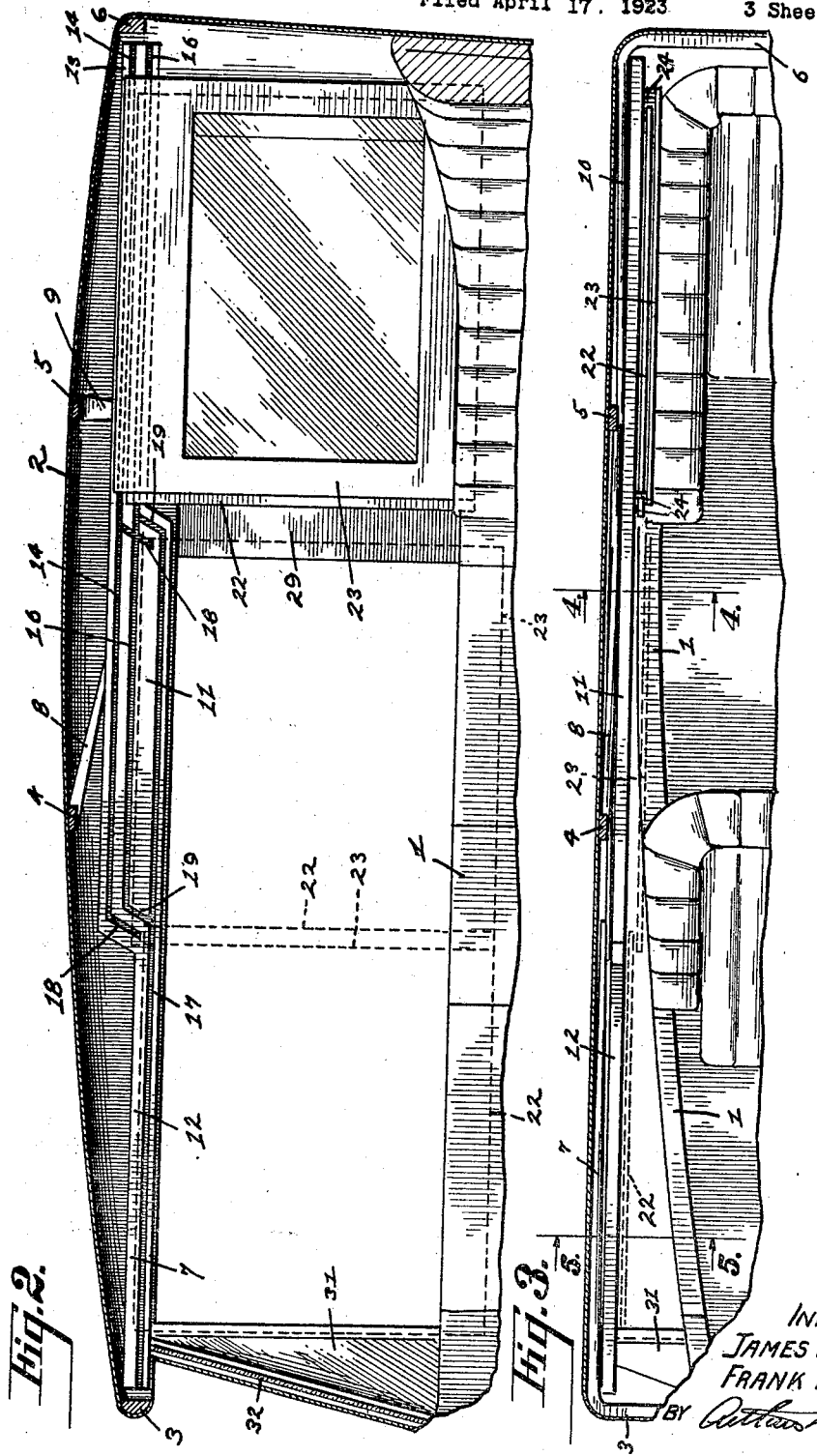

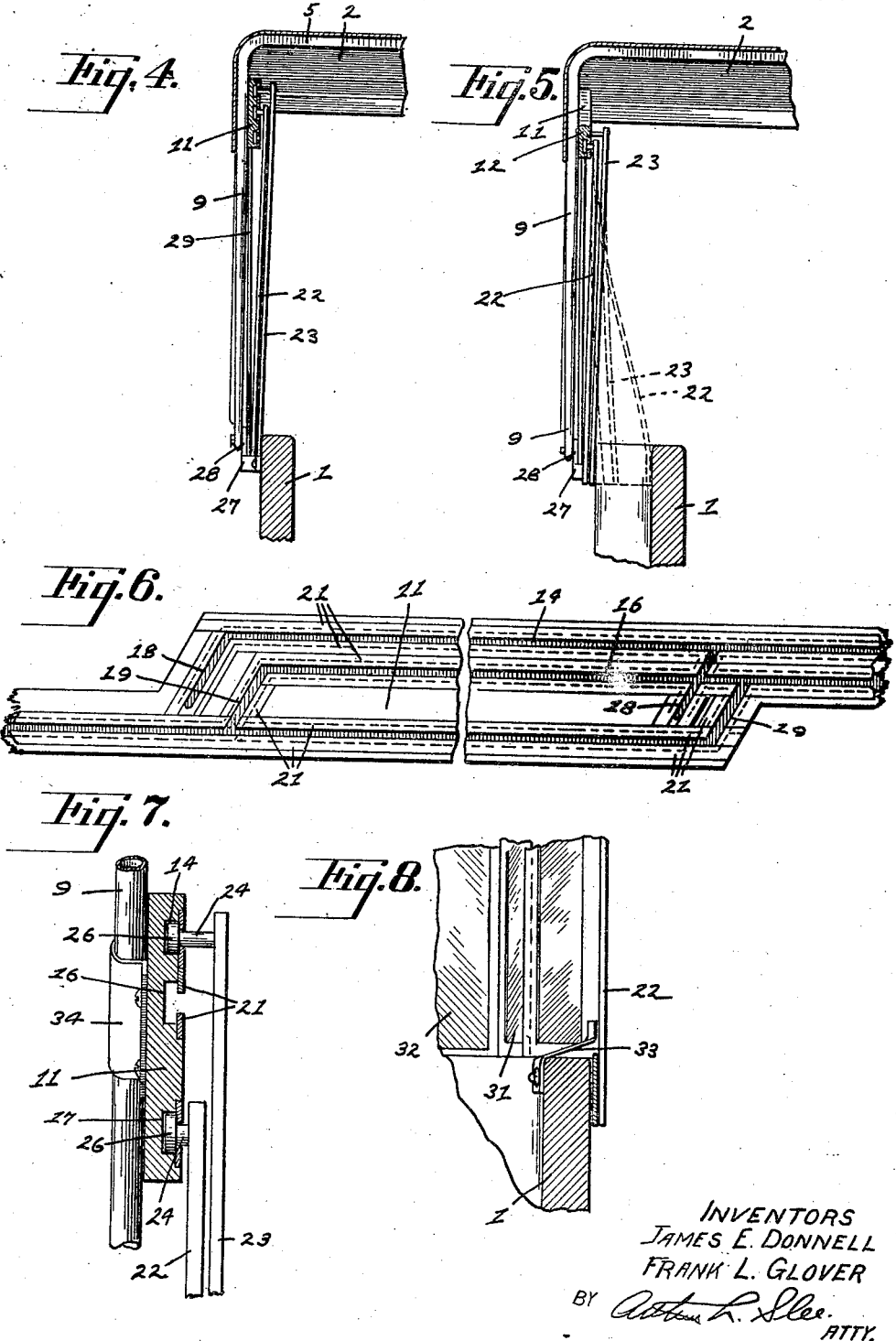

1,509,231

UNITED STATES PATENT OFFICE.

JAMES E. DONNELL AND FRANK L. GLOVER, OF SAN FRANCISCO, CALIFORNIA.

SLIDING CURTAINS FOR AUTOMOBILES.

Application filed April 17, 1923. Serial No. 632,668.

*To all whom it may concern:*

Be it known that we, JAMES E. DONNELL and FRANK L. GLOVER, citizens of the United States, residing in the city and county of San Francisco and State of California, have invented a new and useful Improvement in Sliding Curtains for Automobiles, of which the following is a specification.

Our invention relates to improvements in sliding side curtains for automobiles and means for mounting the same within the sides of automobile tops of the ordinary type.

The primary object of our invention is to provide an improved means for mounting side curtains for sliding movement within the sides of an automobile top.

Another object is to provide an improved construction which will facilitate the installation of sliding curtains in connection with tops of the character commonly installed upon automobiles of the type commonly termed "touring cars".

A further object is to provide an improved arrangement adapted to facilitate the movement of the curtains from a normal position at the back of the top to positions closing the sides of the top, and to simplify the securing of the curtains in such closed position.

Another object is to provide an improved construction and arrangement whereby the curtains are caused to cooperate with the top and the body of an automobile to obtain increased effectiveness in wind, rain and the like from the interior of the automobile.

Our invention consists in the details of construction and arrangement of parts shown in the drawings forming a part of the present specification wherein like characters of reference are used to designate similar parts throughout said specification and drawings and in which—

Fig. 1 is a broken side elevation of an automobile showing the application of our improved side curtains thereto.

Fig. 2 is a broken vertical longitudinal section of the top of an automobile showing the manner in which the curtains are mounted in connection therewith.

Fig. 3 is a broken horizontal longitudinal section showing a plan view of the curtains and curtain mounting.

Fig. 4 is a broken vertical transverse section taken upon the line 4—4 of Fig. 3 in the direction indicated.

Fig. 5 is a similar view taken upon the line 5—5 of Fig. 3, showing the manner in which the curtains are moved to the closed position.

Fig. 6 is a broken side elevation of one of the supporting members showing the arrangement of the grooves thereon.

Fig. 7 is a transverse section of a supporting member showing the manner in which it is secured to the frame of the top.

Fig. 8 is a broken transverse section showing the manner in which the curtains are secured in closed position.

Referring to the drawings the numeral 1 is used to designate in general the body of an automobile provided with the usual top 2 of the character commonly installed upon automobiles of the type termed "touring cars". The top is mounted upon bows 3, 4, 5 and 6 carried by pivotally connected arms 7, 8, 9 and 10 in any of several manners commonly employed, the type shown in the drawings illustrating a construction wherein the arm 9 is pivotally mounted upon the body 1 and the remaining arms pivotally connected thereto. The construction and arrangement of the supporting arms varies in different makes of automobiles and tops and as the particular construction of the supporting structure forms no part of the present invention and is immaterial to the practical application of our invention to an automobile a detailed description of such parts is herein unnecessary.

Upon the inner sides of the frame of the top, which frame consists of the bows and arms above mentioned are secured a pair of supporting members 11 each consisting of a central body portion having a forward extension 12 and a rearward extension 13. An upper groove 14 and a lower groove 16 are formed upon the rearward extension 13 and upon the body 11, said grooves being formed in vertically spaced parallel relation. A groove 17 is formed in the forward extension and in the body portion in spaced relation below the groove 16. A pair of angularly disposed grooves 18 are formed in the body portion 11, said grooves 18 being rearwardly inclined and opening into the upper groove 14 and terminating at a point slightly above the groove 17. A second pair of similarly inclined grooves 19 are formed in the body portion 11 to communicate between the groove 17 and the lower groove 16 of the body and the rearward extension 13.

Plates 21 are secured upon the face of the supporting member adjacent each of the grooves above mentioned, the edges of said plates extending over the grooves to form retaining edges along both edges of each groove thereby forming T shaped tracks in the surface of the supporting member as best shown in Figs. 6 and 7 of the drawings.

A pair of side curtains are mounted upon each supporting member in slidable engagement with the grooves thereof, said curtains consisting of a forward side curtain 22 and a rearward side curtain 23 each comprising a slightly bendable frame upon which a suitable transparency is secured. The side curtains are provided with the supporting pins 24 secured upon the upper edges thereof and provided with heads 26 adapted to be received within the grooves of the supporting member 11 and retained therein by the plates 21. The pins 24 and the forward side curtain 22 are engaged within the lower groove 16 and are movable along said groove to the angularly disposed grooves 19 and thence to the groove 17 in the forward extension. The pins 24 of the rearward side curtain engage the upper groove 14, said pins being of a diameter slightly less than the diameter of the pins 24 of the forward side curtain, the space between the plates 21 adjacent the groove 14 being correspondingly spaced a less amount for a purpose that will hereinafter be more fully explained. The pins 24 of the rearward side curtain are movable along the groove 14 into the inclined grooves 18, the pairs of grooves 18 and 19 being spaced to correspond to the distance between the supporting pins 24 of the respective curtains. The supporting pins of the rearward side curtain are made sufficiently long to cause the curtain to clear the forward curtain when the curtains are suspended from their respective grooves as shown in the drawings. Both forward and rearward side curtains are made sufficiently long to overhang the edge of the body 1 when mounted upon the supporting member 11 as above described.

As above mentioned, the frame of the top 2 is commonly provided with a pivotal connection mounted upon the sides of body 1. As such pivotal mounting is commonly secured near the upper edge of the body, there is not sufficient clearance to permit the curtains to move between the top frame mounting and the body of the automobile, particularly as the curtains are made to overhang the edge of the body, and therefore will not pass over the frame mounting. To avoid this interference we provide a metal strap 27 which is secured upon the sides of the body and provided with an extension 28 arranged to receive a pivotal connection with the top frame, said strap being shaped to extend outwardly into slightly spaced relation to the side of the body, the pivot mounting being thus slightly spaced from the body. The strap 27 is extended rearwardly along the side of the body to receive the lower edge of the usual rear curtain 29 commonly provided with tops of the character described, and to hold said lower edge in slightly spaced relation to the body 1. In this manner both the top frame and rear curtain of the top are held slightly away from the body of the automobile in such manner as to permit the forward and rearward side curtains 22 and 23 to be moved to a normal position at the back of the top on proximate matching relation with each other and with the rear curtain 29 as shown in full lines in Figs. 2 and 3 of the drawings. When in the normal position the side curtains are supported in slightly elevated position by the grooves 14 and 16 in the rearward extension 13 of the supporting member 11, the lower edges being engaged between the rear curtain and the side of the body.

When it is desired to close the side of the top, the side curtains are moved along their respective grooves to the positions shown in full lines in Fig. 1 and in dotted lines in Figs. 2 and 3 of the drawings. The forward side curtain 22 is moved along the groove 16 until the pins 24 reach the inclined grooves 19. A further movement of the curtain causes the pins to move downwardly through the grooves 19 to the groove 17 along which groove the curtain is then moved to its position at the front of the top. The rearward side curtain 23 is moved along the upper groove 14 until the pins 24 reach the inclined grooves 18, the curtain being then guided downwardly to its closing position.

A front curtain 31 is secured in any suitable manner upon the forward end of the body adjacent the wind shield 32 of the automobile, said curtain being held rigidly in position and arranged to admit the forward end of the side curtain 22 between the edge of the curtain 31 and the body.

The top 2 is ordinarily made substantially rectangular in shape, the forward end being wider than the forward end of the body 1 which is commonly made narrower at the front than at the back. Thus, when the side curtains are moved forward along the supporting members 11, the curtains will normally assume a pendant position with the lower edges slightly spaced from the sides of the body 1. This relation is taken advantage of by making the side curtains of a slightly flexible nature so that as the forward curtain 22 is moved to the extreme position it may be bent inwardly and the forward edge caused to enter between the front curtain 31 and the body, the curtain 22 being thus slightly distorted as shown in dotted lines in Fig. 5 of the drawings. When the rearward side curtain 23 is advanced the forward edge will be admitted between the curtain 22 and the body. It will now appear that the forward edge of the curtain 22 and the rearward edge of the curtain 23 will be held against the sides of the body while the adjacent edges of said curtains will be slightly spaced away from the body. Both curtains may now be drawn closely against the body 1 by means of a securing element 33 such as the strap shown in the drawings which is connected upon the rearward edge of the curtain 22 and arranged to be drawn over the edge of the body and secured to a suitable fastening element upon the inner side of the body, the inward movement thus imparted to the curtain 22 causing the forward edge of the curtain 23 to be firmly held between the curtain 22 and the body. As the front and rear edges of the curtains 22 and 23 respectively are held by the front and rear curtains 31 and 29 it is thus apparent that a single fastening device will serve to hold both curtains in position, the distortion of the curtain frames creating sufficient stress to firmly retain the curtains in correct relation and to prevent rattling of the parts.

As the several curtains are arranged to overlap each other and to overhang the edge of the body it will be noted that the sides of the top will be effectively closed and wind, rain, etc., excluded from the automobile.

The mounting of the curtains 22 and 23 upon the vertically spaced tracks formed by the grooves in the single supporting element upon each side of the top constitutes an extremely simple and economical means for installing the curtains. The supporting members 11 are readily secured upon the arms 7, 8, 9, and 10 by means of suitable clamps such as shown at 34 in Fig. 7 of the drawings, the arrangement of the grooves and the supporting pins being such that the curtains are automatically lifted to clear obstructions and to enter between the rear curtain and the body of the automobile when said curtains are moved to their normal position at the back of the top, and to be similarly lowered to assume their correct relation for closing the sides of the top when advanced to the closing position.

The pins 24 of the forward side curtain 22 are made slightly larger than the pins of the rearward curtains 23 and the grooves 14 and 18 arranged to receive the same to prevent said pins from entering the inclined groove 18 at the point where the groove 16 crosses said groove 18.

Either curtain may of course be moved to the mid position independently of the other curtain thereby closing a portion of the side of the top and leaving the remaining portion open. When this relation is desired it is preferable to move the rearward curtain 23 forward to its closing position as it is effectively retained in this position by gravity, the pins 24 being engaged at the extreme ends of the inclined grooves 18. The forward curtain 22 may of course be moved to any desired intermediate position between the extremes of its movement.

Having thus described our invention what we claim as new and desire to secure by Letters Patent is—

1. In a device of the character described, a pair of supporting members secured upon the inner sides of the frame of an automobile top, each supporting member having an upper groove formed therein and spaced angularly disposed grooves formed in the central portion of the member and communicating with said upper groove, each member also having a lower groove formed in vertically spaced parallel relation to the upper groove, and a forwardly extending groove vertically spaced below the lower groove and connected thereto by angularly disposed grooves; a pair of side curtains mounted upon each supporting member in slidable engagement with the grooves and normally held in parallel matching relation adjacent the back of the top, one of said curtains engaging the lower groove and being movable along said groove and the angularly disposed grooves connected thereto to the forwardly extending groove and the other curtain engaging the upper groove and being movable therealong into the angularly disposed grooves opening thereinto to close the sides of the top.

2. In a device of the character described, a pair of supporting members secured upon the inner sides of the frame of an automobile top, each member consisting of a central body portion having a rearwardly extending portion and a forwardly extending portion; upper and lower vertically spaced grooves formed in the body portion and the rearward extension; a groove formed in the forward extension and the body portion in vertically spaced relation to the grooves of said body portion; a pair of angularly disposed grooves formed in the body portion in communication with the upper groove; a pair of angularly disposed grooves formed in the body portion to communicate between the lower groove and the groove in the forward extension; and a pair of side curtains slidably engaging the grooves of each supporting member and movable therealong to positions closing the sides of the top.

3. In a device of the character described, a supporting member comprising a central body portion provided with a forward extension and a rearward extension; an upper and a lower groove formed upon the rearward extension and the central portion; a groove formed in the forward extension and the central portion, said groove being spaced below the grooves of the central portion and the rearward extension; and a plurality of angularly disposed grooves formed in the body portion, and arranged in pairs, one pair of said grooves communicating with the upper groove, and another pair of said grooves communicating between the lower groove and the groove in the forward extension; said grooves combining to form tracks for a pair of side curtains independently mounted thereon.

4. In a device of the character described, a supporting member comprising a central body portion provided with a forward extension and a rearward extension; an upper and a lower groove formed upon the inner side of the central portion and the rearward extension; a groove formed upon the forward extension and spaced below the grooves of the central portion and rearward extension; a plurality of angularly disposed grooves arranged in pairs upon the central body portion one of said pairs communicating with the upper groove and another pair communicating between the lower groove and the groove of the forward extension; and plates secured upon the supporting member upon the sides of grooves, said plates overhanging the grooves to form a T-shaped groove arranged to slidably engage side curtains independently mounted within the upper and lower grooves.

In witness whereof, we hereunto set our signatures.

JAMES E. DONNELL.
FRANK L. GLOVER.